United States Patent
Lueckenhoff et al.

(10) Patent No.: US 8,774,056 B2
(45) Date of Patent: Jul. 8, 2014

(54) AUTOMATED DEVICE DISCOVERY ON A NETWORK

(75) Inventors: Bruce Arthur Lueckenhoff, Brentwood, TN (US); Robert Clay Jennings, Smyrna, TN (US); Aaron Michael Dudley, Rockvale, TN (US); Michael William Pyle, Hermitage, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 148 days.

(21) Appl. No.: 13/247,228

(22) Filed: Sep. 28, 2011

(65) Prior Publication Data

US 2013/0077529 A1    Mar. 28, 2013

(51) Int. Cl.
    *H04L 12/28*    (2006.01)

(52) U.S. Cl.
    USPC ........................................... 370/255

(58) Field of Classification Search
    USPC ............................. 370/254, 255, 338
    See application file for complete search history.

(56) References Cited

U.S. PATENT DOCUMENTS

| | | | |
|---|---|---|---|
| 6,636,499 B1 * | 10/2003 | Dowling | 370/338 |
| 7,110,404 B1 | 9/2006 | Temoshenko | |
| 7,480,251 B2 | 1/2009 | Foschiano et al. | |
| 7,499,445 B2 | 3/2009 | Previdi et al. | |
| 7,826,482 B1 * | 11/2010 | Minei et al. | 370/467 |
| 7,899,005 B2 | 3/2011 | Retana et al. | |
| 8,060,927 B2 * | 11/2011 | Engdahl et al. | 726/13 |
| 2007/0211701 A1 | 9/2007 | Smith et al. | |
| 2009/0287803 A1 * | 11/2009 | McQuillan et al. | 709/222 |
| 2010/0312875 A1 | 12/2010 | Wilerson et al. | |
| 2011/0090834 A1 | 4/2011 | Hares et al. | |
| 2012/0084324 A1 * | 4/2012 | Lloyd et al. | 707/784 |

OTHER PUBLICATIONS

Real Time Tracking of Energy Data, Energy Tracking, Energy Meter Specifications for Submetering, Tracking, Power Measurement http://www.energytracking.com/wem.specs.htm, pp. 1-2, 2005-2011.

Power and Energy Meters, Power and Advanced Electronic Energy Meters, Eaton Powering Business Worldwide, http://www.eaton.com/Electrical/USA/ProductsandServices/PowerQuality, p. 1-2, 2011.

* cited by examiner

*Primary Examiner* — Mark Rinehart
*Assistant Examiner* — Mohammad Anwar
(74) *Attorney, Agent, or Firm* — Brinks Gilson & Lione

(57) ABSTRACT

A system and method provide automated discovery of devices on a network. The system may include specialized communications between devices for monitoring and tracking the devices. In particular, devices may transmit and/or receive messages over the network that includes information for discovering, identifying, and/or managing each of the devices on the network.

22 Claims, 5 Drawing Sheets

AUTOMATED DEVICE DISCOVERY ON A NETWORK

BACKGROUND

Power measurement systems may include a plurality of devices, such as sensors, meters, and other associated devices connected in one or more networks. The addition or subtraction of devices from a network may require a manual configuration to update the system and its devices. For example, the addition of power meters to a power measurement system network may be both time-consuming and difficult to monitor locations of and communications between power meters.

Updating and configuring the devices when there are any changes to the network may also slow down the network with traffic. Additional network traffic may be required for discovering, managing, and configuring the devices on the network. It may be beneficial to improve the monitoring and discovery of devices in a network by providing an automated device discovery process that provides for efficient network communications.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

By way of introduction, the embodiments described below include a system and method for utilizing a communication protocol for the automated discovery of devices on a network. In particular, devices transmit and/or receive messages utilizing the specialized protocol over the network. The messages may include information for discovering, identifying, and/or managing devices on the network.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments.

Figure 1:
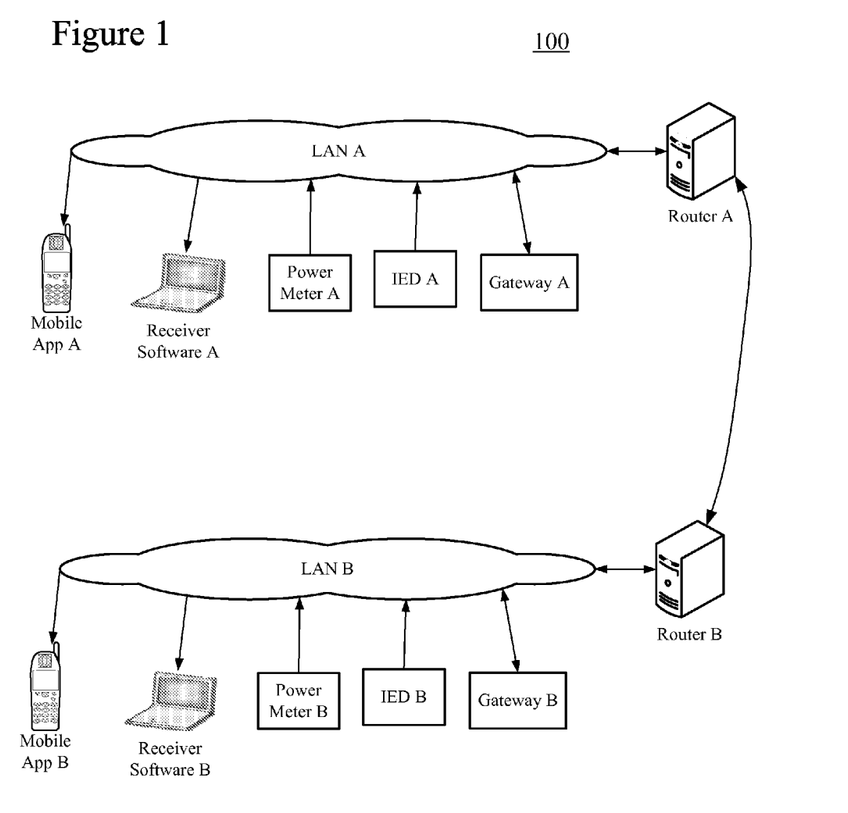
FIG. 1 is an exemplary power measurement system.

FIG. 1 is an exemplary power measurement system 100. The power measurement system 100 illustrates two local area networks ("LANs"), LAN A and LAN B. LAN A is coupled with router A that may connect to router B, which is coupled with the LAN B. The router A and router B may be connected over a public network, such as the Internet (not shown). LAN A and LAN B are each a local area network with different devices that are part of that local area network.

LAN A includes a mobile application ("app") A, receiver software A, a power meter A, an intelligent electronic device ("IED") A, and/or a gateway A. LAN B includes a mobile app B, receiver software B, a power meter B, an IED B, and/or a gateway B. Each of the devices illustrated in the system 100 may be referred to as nodes. As described with respect to FIGS. 2-4, some devices on the LAN may be transmitters, listeners, or both. In particular, the devices on the LANs may communicate using the neighbor discovery protocol ("NDP") discussed below.

The neighbor discovery protocol ("NDP") may provide a way to automatically discover neighbor devices located on a single LAN or on a network of LANs. NDP messages may provide an efficient communication mechanism for neighbor discovery that doesn't slow down network communications with excessive network traffic and has low space and speed requirements for receiving/transmitting processors. An NDP message may also be referred to as an NDP packet and may encode information about the transmitter of the message. Listeners or receivers of NDP messages may discover neighbor devices as well as discover certain information about neighbor devices, including information described with respect to FIG. 5. In one embodiment, NDP may be carried using the User Datagram Protocol ("UDP"). The UDP may be carried using the Internet Protocol ("IP"). Assuming UDP and IP may be the protocols upon which NDP is built, the listening and transmitting devices should support UDP and/or IP communications.

The NDP message or packet may also be referred to as a "hello" message or a hello packet. The message may be a single direction message for which no response is provided. In other words, the NDP or hello message is transmitted by one device and received by another device without a response message or an acknowledgment being provided. The message may be an unacknowledged UDP datagram containing header and a sequence of type-length-value messages ("TLVs") as described below. The message may be sent periodically at a set or variable rate. For example, the transmitter may transmit a message once every 300 seconds in one embodiment.

An exemplary NDP message or packet may be variable in size. Integer fields may be carried in "big-endian" or "network order" format. In other words, a most significant byte (octet) may be first. Bits designated as "padding" or "reserved" (r) are set to 0 by senders and ignored by receivers. Numeric constants may be in decimal form (base 10). The format of an exemplary NDP header is illustrated in Table 1:

TABLE 1

| NDP Header Format | | | | | | | | | | | | | | | | | | | |
|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | ... 31 |
| Version = 1 | | | | | | | Reserved = 0 | | | | | | | | | TLV's | | | |

As shown in Table 1, the exemplary NDP header may include an NDP version number field. The version number be in 8 bits and is shown as 1 in Table 1. The NDP header may also include a reserved field. The reserved field may be 8 bits. In one embodiment, the reserved field is set to zero by senders/transmitters and is ignored by listeners/receivers.

A TLV is a type-length-value, which is an encoding scheme used with different protocols. The type and length fields may be fixed in size, while the value field may be variable in size. In one embodiment, the type may be a binary code which indicates the type of field that a particular TLV represents. Length may be the size of the value field. Value is variable sized series of bytes which may include the data to be communicated. An exemplary format of the TLV is illustrated in Table 2:

TABLE 2

NDP TLV Format

| 0 1 2 3 4 5 6 7 | 8 9 10 11 12 13 14 15 | 16 17 18 ... 31 |
|---|---|---|
| Type | Length | Value ... |

When each TLV is encountered, it may be skipped if it is a TLV type which is not understood. In this way, communications may be made with multiple devices, each of which may read certain TLV types, but ignore other TLV types. Accordingly, TLV types may be added without causing issues for existing or previously used TLV implementations.

Exemplary NDP TLV types may include a number of types and/or functions. Some of the types are further described with respect to FIG. 5. In one example, the NDP TLV type may be a community value. The community type may be two bytes that describe a particular community to which a transmitting device belongs. The community value may be used to segregate devices within a single LAN or within multiple networks. For example, in FIG. 1, the power meters (power meter A and power meter B) may be assigned to one community, while the IED's (IED A and IED B) may be assigned to a different community. Accordingly, certain data may be communicated only within the community by analyzing the community value. For example, a receiving device (e.g. mobile app, receiver software, gateway) may be set to only monitor devices from a particular community.

In another example, the NDP TLV type may be a device identification ("ID"). The device ID may be a variable length, free-form text field that describes the device. For example, the device ID may include a description of the make/model of a device. Accordingly, if a device must be replaced (with the same model) then the device ID may be used to maintain identification of the device.

In another example, the NDP TLV type may be a software version. The software version may be a variable length, free-form text field that describes the version of the software on the device. The software version may be utilized to discover which devices are due for firmware updates. Alternatively, an NDP message may be sent out that includes information that is only designated for devices with a particular software version. In another embodiment, systems may advertise to serve firmware images to peer systems. This may or may not utilize the software version feature. This implementation may allow updated firmware to diffuse throughout a network without visiting each node to be updated. Alternatively, system management software may automatically learn the Internet Protocol ("IP") address and/or firmware version the systems on a network without having to manually configure them. Accordingly, inspection of this information may be leveraged to allow systems to inspect other systems they have discovered and learn all the systems already known to the first system. For example, this may allow a device to quickly learn all the devices known by a pre-arranged partner device.

In another example, the NDP TLV type may be a platform. The platform may be a variable length, free-form text field that describes the platform of the sending device. In other words, the platform may identify the product of the sending device. The identification may just be the product name, or may include more detailed information including model numbers.

In another example, the NDP TLV type may be time-to-live. The time-to-live may be a 32 bit number field that identifies the amount of time that a receiver of this NDP message should consider it valid. The time-to-live may be an expiration date of the NDP message that establishes how long the data is valid. In one embodiment, the time-to-live is a number of seconds during which the message is valid. Accordingly, the transmitter submits messages at least as frequently as the time-to-live number of seconds in order to be seen as continuously available by receivers. The time-to-live value may be a small multiple (e.g. two or three) of the interval between NDP message transmissions. For example, if a system sends out an NDP message every 300 seconds, it may utilize a time-to-live value of 600 seconds.

In another example, the NDP TLV type may be a serial number. The serial number may be a 32 bit serial number of the sending device.

In another example, the NDP TLV type may be a Media Access Control ("MAC") address. The MAC address field may be six bytes. The MAC address may be the MAC address of a transmitter device on a network. A device may have multiple LAN interfaces, so there may be multiple MAC addresses to choose from. In one embodiment, even if there are multiple MAC addresses, a single MAC address is chosen and used for the NDP messages.

In another example, the NDP TLV type may be a capability bitmap. The capability bitmap may be a 32 bit bitmap that includes zero or more set capability bits describing features of the transmitting device. The bitmap may be the logical OR of the supported capability bits. Exemplary capability bits may include whether the sending device supports a world wide web ("WWW") interface; whether the transmitting device is a Modbus Gateway or has one or more Modbus/RTU devices behind it; or whether the transmitting device is a Modbus end device, which may be referred to as a Modbus slave. In other words, bit 0 may be WWW interface, bit 1 may be Modbus gateway, and bit 2 may be Modbus end device. Multiple capability bits may be set. For example, a Modbus gateway may be a Modbus end device. Additional capability bits may include support for one or more diverse industrial control systems protocols, such as LONworks, BACNET, PROFINET, etc. Further, there may be capability bits indicative of network time protocol ("NTP") server support, dynamic host configuration protocol ("DHCP") server support, simple network management protocol ("SNMP") v1/v2/v3 support, tunnel or virtual private network ("VPN") endpoint support. These are merely examples of capabilities and there may be more capabilities included.

The default IP address to which transmitters transmit may be an IP Multicast Group address. Alternatively, the destination IP address may be changed to a unicast destination, if an organization has designated that host as a central discovery point. Alternately, the broadcast or subnet directed broadcast address may be used as the destination IP address. The source IP address may be retrieved from the message or packet. The user datagram protocol ("UDP") port may be changed for any particular implementation or installation. In one embodiment, the default UDP destination port is 59.

Since NDP may transmit details about a device (e.g. software version), NDP may have security features to secure those details. For example, NDP may be in-secure. NDP may include an option for enabling or disabling the security. Some implementations may disable the security if it is not required.

Referring back to FIG. 1, the mobile app A may listen for neighbor discovery protocol communications over LAN A. Likewise, the receiver software A may also listen for neighbor discovery protocol communications over LAN A. The mobile app A and receiver software A may not be discoverable on LAN A because they are merely listening or receiving discovery messages rather than transmitting their own discovery messages. The power meter A and IED A may be examples of devices that transmit a discovery message over LAN A using the neighbor discovery protocol. The gateway A may be an exemplary device that both listens for discovery messages and transmits discovery messages over LAN A using the neighbor discovery protocol.

As with LAN A, the devices on LAN B may also communicate discovery messages using the neighbor discovery protocol. The mobile app B may listen for neighbor discovery protocol communications over LAN A. Likewise, the receiver software B may also listen for neighbor discovery protocol communications over LAN B. The mobile app B and receiver software B may not be discoverable on LAN B because they are merely listening or receiving discovery messages rather than transmitting their own discovery messages. The power meter B and IED B may be examples of devices that transmit a discovery message over LAN B using the neighbor discovery protocol. The gateway B may be an exemplary device that both listens for discovery messages and transmits discovery messages over LAN B using the neighbor discovery protocol. In one embodiment, the neighbor discovery protocol may allow for the discovery of devices across different LANs. For example, the receiver software A may discover the transmitting devices in LAN A, as well as the transmitting devices in LAN B (e.g. power meter B, IED B, Gateway B).

The network or networks, including LAN A and LAN B, that may connect any of the components in the power measurement system 100 to enable communication of data between the components and devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. The network between LANs (e.g. the connection between router A and router B) may be a public network, such as the Internet, a private network, such as an intranet, or combinations thereof, and may utilize a variety of networking protocols now available or later developed including, but not limited to TCP/IP or other IP based networking protocols. The network (s) may include one or more of a local area network (LAN), a wide area network (WAN), a direct connection such as through a Universal Serial Bus (USB) port, and the like, and may include the set of interconnected networks that make up the Internet. The network may include any communication method or employ any form of machine-readable media for communicating information from one device to another.

FIG. 1 illustrates exemplary devices which may be discoverable or which may discover other devices on a LAN using the neighbor discovery protocol. Other devices may transmit and/or receive discovery messages using the neighbor discovery protocol. For example, other devices may include any computing devices that connect with a network. Examples include, but are not limited to, a personal computer, personal digital assistant ("PDA"), cellular phone, or other electronic device. FIG. 1 does illustrate two monitoring devices, a power meter and an IED. Exemplary IED devices include programmable logic controllers ("PLC's"), Remote Terminal Units ("RTU's"), electric/watt hour meters, protection relays and fault recorders as described below. The IED's may make use of memory and microprocessors to provide increased versatility and additional functionality. Such functionality includes the ability to communicate using the neighbor discovery protocol, either via a direct connection, e.g. modem or via a network. For more detailed information regarding IED's capable of network communication, please refer to U.S. Pat. No. 6,961,641, entitled "INTRA-DEVICE COMMUNICATIONS ARCHITECTURE FOR MANAGING ELECTRICAL POWER DISTRIBUTION AND CONSUMPTION", U.S. Pat. No. 6,751,562, entitled "COMMUNICATIONS ARCHITECTURE FOR INTELLIGENT ELECTRONIC DEVICES", and U.S. Pat. No. 7,216,043, entitled "PUSH COMMUNICATIONS ARCHITECTURE FOR INTELLIGENT ELECTRONIC DEVICES," each of which is hereby incorporated by reference.

IED's such as Programmable Logic Controllers ("PLC's"), Remote Terminal Units ("RTU's"), electric power meters, protective relays, fault recorders and other devices may be coupled with power distribution networks to manage and control the distribution and consumption of electrical power. Such devices typically utilize memory and microprocessors executing software to implement the desired power management function. IED's include on-site devices coupled with particular loads or portions of an electrical power distribution system and are used to monitor and manage power generation, distribution and consumption. IED's may also be referred to as power management devices ("PMD's").

Figure 2:
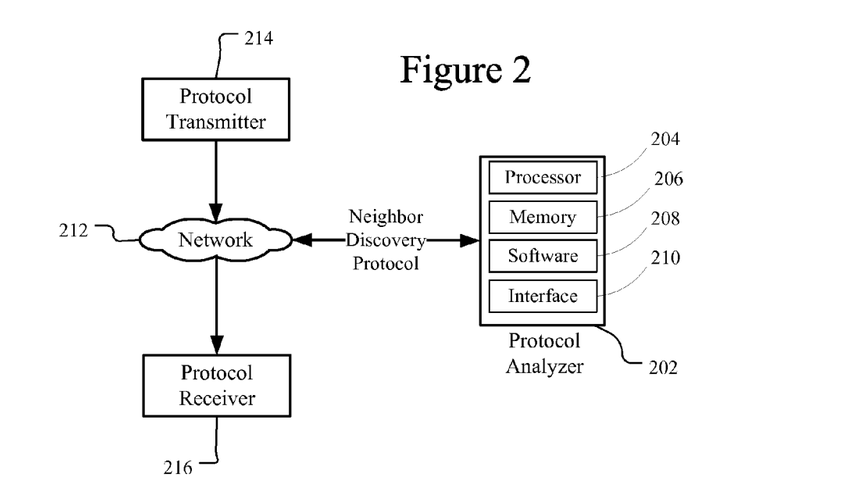
FIG. 2 is an alternate network system.

FIG. 2 is an alternate network system illustrating the communications of protocol transmitter 214 with a protocol receiver 216 over a network 212. The network 212 may be a local area network, such as LAN A or LAN B, or may be a public network. The protocol transmitter 214 transmits discovery messages according to the neighbor discovery protocol. The protocol receiver 216 receives or listens for discovery messages according to the neighbor discovery protocol. The power meter A, IED A, power meter B, and IED B are exemplary protocol transmitters 214 because they transmit discovery messages. The mobile app A, receiver software A, mobile app B, and receiver software B are exemplary protocol receivers 216 because they listen for discovery messages. Certain devices may be both a protocol transmitter 214 and a protocol receiver 216, such as the gateway A or gateway B.

FIG. 2 illustrates a protocol analyzer 202 which communicates using the neighbor discovery protocol. In particular, the protocol analyzer 202 may be a protocol transmitter 214 and/or a protocol receiver 216. The protocol analyzer 202 may also analyze neighbor discovery protocol communications as well as transmit and receive such communications. The network protocol analyzer 202 may include a processor 204, memory 206, software 208 and an interface 210. Likewise, the protocol transmitter 214, the protocol receiver 216, or any of the devices in FIG. 1 may also include the components illustrated with the network protocol analyzer 202 including a processor 204, memory 206, software 208 and an interface 210.

The processor 204 may include a central processing unit (CPU), a graphics processing unit (GPU), a digital signal processor (DSP) or other type of processing device. The processor 204 may be one or more general processors, digital signal processors, application specific integrated circuits, field programmable gate arrays, servers, networks, digital circuits, analog circuits, combinations thereof, or other now known or later developed devices for analyzing and processing data. The processor 204 may operate in conjunction with a software program, such as code generated manually (i.e., programmed).

The processor 204 may be coupled with a memory 206, or the memory 206 may be a separate component. The interface 210 and/or the software 208 may be stored in the memory 206. The memory 206 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 206 may include a random access memory for the processor 204. Alternatively, the memory 206 may be separate from the processor 204, such as a cache memory of a processor, the system memory, or other memory. The memory 206 may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store ad or user data. The memory 206 is operable to store instructions executable by the processor 204. The functions, acts or tasks illustrated in the figures or described herein may be performed by the programmed processor executing the instructions stored in the memory 206. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multi-tasking, parallel processing and the like. The processor 204 is configured to execute the software 208.

The interface 210 may allow for communication within the network 212, or within the LAN A or LAN B. In one embodiment, the interface 210 may include a user interface configured to allow a user and/or administrator to interact with and configure the neighbor discovery protocol and/or the devices that communicate using the neighbor discovery protocol. Accordingly, the interface 210 may include a keyboard, keypad or a cursor control device, such as a mouse, or a joystick, touch screen display, remote control or any other device operative to interact with the monitoring server 102. The interface 210 may include a display coupled with the processor 204 and configured to display an output from the processor 204. The display may act as an interface for the user to see the functioning of the processor 204, or as an interface with the software 208.

Figure 5:
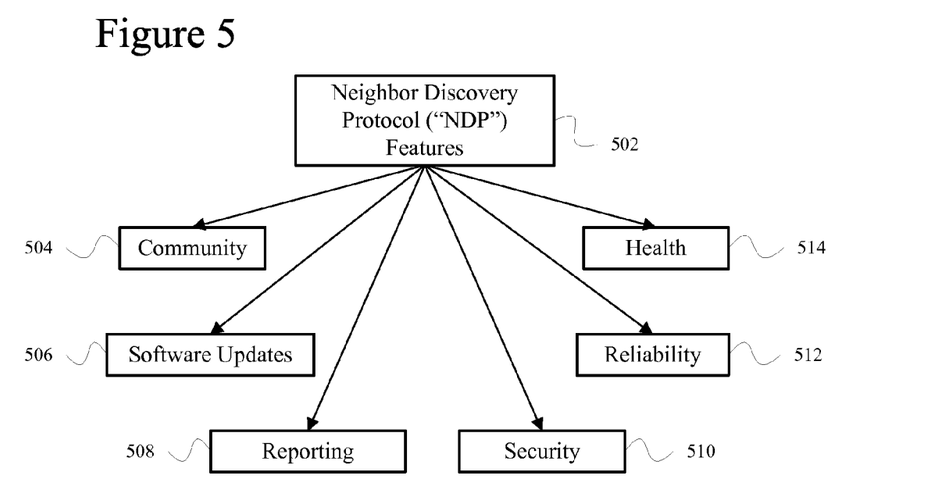
FIG. 5 illustrates exemplary neighbor discovery protocol features.

In addition to being an example of a protocol transmitter 214 or a protocol receiver 216, the protocol analyzer 202 may include the functions illustrated in FIG. 5. The functions illustrated in FIG. 5 include features of the neighbor discovery protocol ("NDP").

Figure 3:
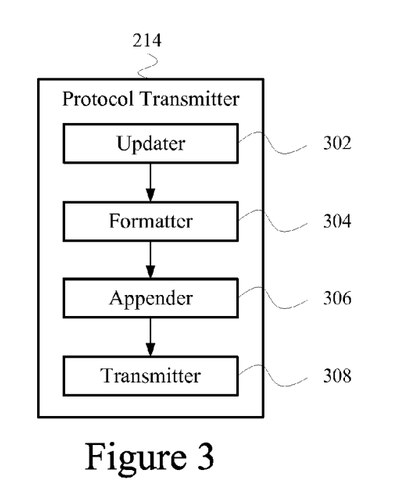
FIG. 3 is an exemplary protocol transmitter.

FIG. 3 is an exemplary embodiment of the protocol transmitter 214. The protocol transmitter 214 may be a protocol analyzer 202 and include the components illustrated in FIG. 2 for the protocol analyzer 202. The protocol transmitter 214 may also be referred to as a sender. The protocol transmitter 214 may have minimal requirements to communicate with the NDP. For example, the protocol transmitter 214 may have an interface capable of sending/receiving UDP datagrams. In addition, the protocol transmitter 214 may have a scheduling mechanism for sending periodic packet transmissions.

The protocol transmitter 214 may include an updater 302, a formatter 304, an appender 306, and a transmitter 308. The updater 302 may update any system information or data that is to be included with an NDP message. Updates may not be necessary before each message and may only occur when data has changed. Exemplary system information that may be included in an NDP message may include any of the NDP TLV types discussed above, as well as a MAC address, IP address, system uptime/downtime, alarms, circuit breaker trips, functions/protocols, security features, or feature capability bits.

The formatter 304 formats the NDP message, including the header information discussed above. The NDP message header may be formatted as in Table 1 shown above. The appender 306 appends the TLV's to the NDP message. As discussed above, the TLVs may include the system information that is communicated with the NDP message. In other words, the information about a device is put into TLVs, which are appended to the NDP message. With the header and the TLVs, the NDP message is ready to be sent by the transmitter 308. The NDP message may be sent periodically (e.g. at a time interval, such as 300 seconds) or a new NDP message may be sent when any of the device information from the TLVs is changed or updated by the updater 302.

Figure 4:
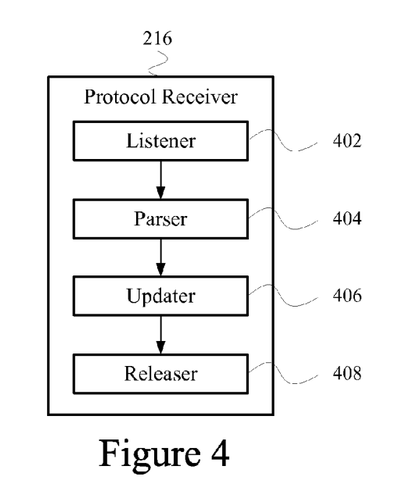
FIG. 4 is an exemplary protocol receiver.

FIG. 4 is an exemplary embodiment of the protocol receiver 216. The protocol receiver 216 may be a protocol analyzer 202 and include the components illustrated in FIG. 2 for the protocol analyzer 202. The protocol receiver 216 may include a listener 402, a parser 404, an updater 406, and a releaser 408. The protocol receiver 216 may also be referred to as a listener. In one embodiment, the protocol receiver 216 may have Internet Group Multicast Protocol ("IGMP") support in order to signal its interest in the default multicast group address to IGMP-aware switches, and so received packets may be transmitted to that group address.

The listener 402 listens for an NDP message to be transmitted over the network. When an NDP message is transmitted, the listener 402 receives the message and it is parsed by the parser 404. The parsing of the NDP message may include parsing each of the packets TLVs, where TLVs that may be ignored if they are not what the protocol receiver 216 is listening for. The protocol receiver 216 may be set to receive certain information from the NDP messages, and the parser 404 can ignore the other information in the NDP message. In one embodiment, the type value of the TLV may be used by the protocol receiver 216 to identify which packets it will look at and which packets it will ignore.

Once the relevant information is identified by the parser 404, the updater 406 may utilize that information. In one embodiment, the protocol receiver 216 tracks information about devices on a network and when the parser 404 identifies relevant information from a recent NDP message, that information is updated with the newer information from the NDP message. For example, mobile software A or B may be a protocol receiver 216 that monitor which devices are on a network and each NDP message is analyzed to determine which devices are on the network. If a new device is on the network, the NDP message from that device is parsed and the presence of that device is logged by the mobile software by the updater 406. In alternative embodiments, the updater 406 may be referred to as an extractor and/or analyzer because the received relevant information is extracted and/or analyzed.

The releaser 408 releases the packet back to the system. In one example, the releaser 408 provides the NDP message back to the operating system. In other words, after the NDP message or packet is received, parsed, and information is extracted, the NDP message or packet may give any used resources back to the operating system. The receipt of the message by one protocol receiver does not preclude the packet from being received by each protocol receiver in the network while resources are being used for analysis.

FIG. 5 illustrates exemplary neighbor discovery protocol ("NDP") features 502. In one embodiment, the features 502 may be implemented by any one of the protocol analyzer 202, the protocol transmitter 214, and/or the protocol receiver 216.

One exemplary NDP feature 502 is the establishment of a community 504. The community feature 504 may be established with the community value NDP TLV type described above. The community 504 may be used to segregate devices within a single LAN or within multiple networks. For example, in FIG. 1, the power meters (power meter A and power meter B) may be assigned to one community, while the IED's (IED A and IED B) may be assigned to a different community. Accordingly, certain data may be communicated only within the community by utilizing the community feature 504. A receiving device may be set to monitor devices from a particular community. Protocol listeners may utilize the community 504 to create separate communities that may cohabit a single LAN, yet are logically separate. The community feature 504 may be used to coordinate settings between multiple systems by providing only settings to members of a certain community. Those settings may be ignored by members of other communities.

In one example, the community feature 504 may establish community 0 as a promiscuous community. This may be the default setting. Accordingly, all NDP traffic will be accepted regardless of any community associations in the NDP messages. In other words, the default community may accept any NDP message whether that message has a community value equal to the default setting of 0, or even with a different community value, or no community at all. In other embodiments, the community value of 1 may not be a promiscuous community meaning that only NDP messages for the community value of 1 are received and considered.

Another exemplary NDP feature 502 is software updates 506. The software updates feature 506 may be established with the software version value NDP TLV type described above. NDP messages may advertise a willingness to serve firmware images to peer systems. Firmware updates may be transmitted throughout a network without visiting each node to be updated. The software updates may originate from one source (e.g. a central server) or they may be a peer to peer update.

Another exemplary NDP feature 502 is reporting 508. The reporting feature 508 may include an ability to utilize NDP to report details of devices. In one embodiment, the system may be used to advertise the details of devices connected to their serial field bus networks over the larger IP networks. Accordingly, serial-only devices may appear as if they are natively attached to Local Area Networks (LANs), such as Ethernet networks. A participating gateway device may describe the subordinate serial devices connected to it in its NDP message over the IP network. A device under a remote gateway may become known to another gateway participating in the neighbor discovery protocol. In one example, the reporting feature 508 may report a number of power meters connected to a particular gateway over its RS-485 serial interface (or other interface). The reporting feature may be used by the gateway to advertise the device types and access information for the power meters connected to the gateway. In other words, an NDP message from that gateway includes information about those power meters connected over the serial interface. In one embodiment, a different gateway receiving that NDP message may then be able to access one of the power meters based on the NDP message from the gateway that provides the information about the serially connected power meters.

Another exemplary NDP feature 502 is security 510. The security feature 510 may include securing certain devices within a network. In one state, a system may automatically (or semi-automatically) add discovered neighbors into the list of devices which it may communicate. However, in an alternative state, a system may cease to learn new neighbor devices, and will only communicate with those systems it previously learned about, which may have been manually configured as safe to communicate with. In one embodiment, the security feature 510 may provide a non-volatile configuration setting signifying in which state a system should operate. There may be a refusal to hear NDP messages from certain devices.

Other exemplary NDP features 502 include reliability 512 and health 514. In particular, a device may maintain a record of reliability and/or health. A receiving device may then monitor the reliability and health of each discovered device in a system. In one example, reliability may be measured by how often a device has timed out. When a device has poor reliability or health, that device may be removed as a discovered device for certain message receivers. Other features may include device name abstraction where a device is associated with an abstract name, so it could be replaced with a similar device but may be treated the same if the abstract name is unchanged.

Figure 6:
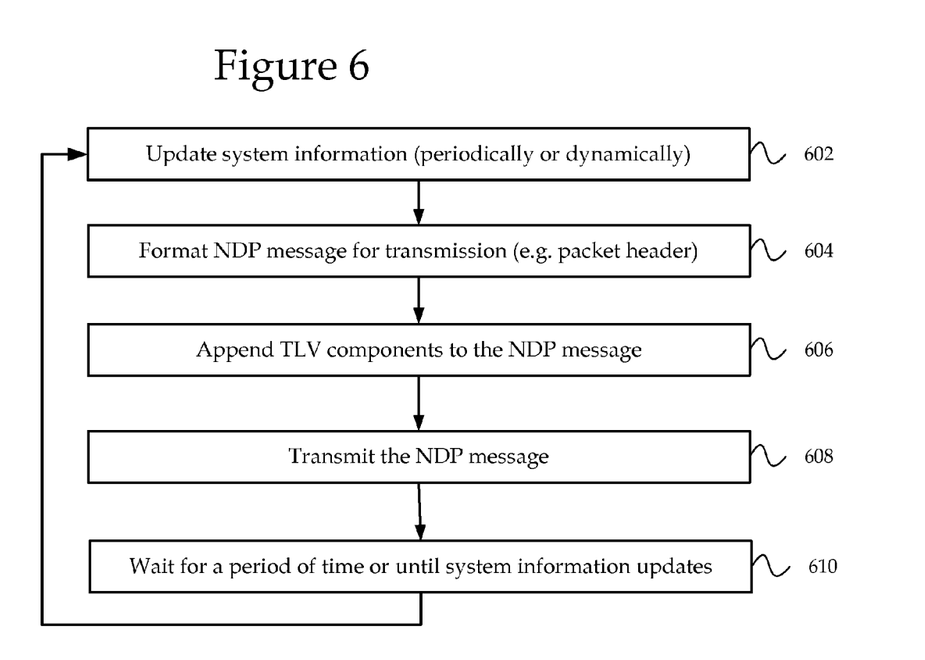
FIG. 6 is an exemplary process for protocol transmission.

FIG. 6 is an exemplary process for protocol transmission. In one embodiment, the protocol transmitter 214 in FIGS. 2-3 may implement this process. In block 602, device information may be updated periodically or dynamically. The device information may include any information about the device that is then transmitted in an NDP message. The NDP message is formatted for transmission by including a packet header in block 604 and by appending the device information as TLV components in the NDP message in block 606. Once the NDP message is formatted and includes the device information as TLVs, the message is transmitted as in block 608. The process may be repeated periodically or when device information is updated as in block 610.

Figure 7:
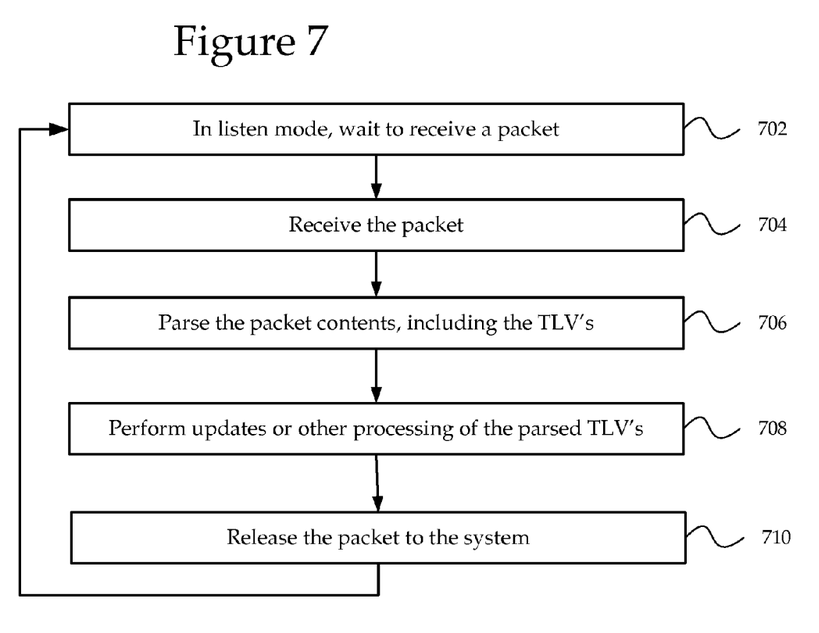
FIG. 7 is an exemplary process for protocol reception.

FIG. 7 is an exemplary process for protocol reception. In one embodiment, the protocol receiver 216 in FIGS. 2 and 4 may implement this process. In a listen mode, a receiver waits to receive a packet or message as in block 702. The packet is received in block 704 and parsed in block 706. The parsing of the packet includes reviewing each of the TLVs to identify what device information is needed and extracting that information from the relevant TLVs. This processing of the TLVs includes extraction of information stored in the TLVs as in block 708. Once the information is extracted, the packet is released as in block 710, and the receiver awaits receipt of the next packet. In one embodiment, the receiver device may discover all devices by maintaining a list of devices from which it receives an NDP message where the list is updated in block 708 for each device that sends an NDP message.

A "computer-readable medium," "machine readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory. The term "computer-readable medium" shall also include any medium that is capable of storing, encoding or carrying a set of instructions for execution by a processor or that cause a computer system to perform any one or more of the methods or operations disclosed herein.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for automatically discovering devices on a network, the method comprising:
   utilizing a neighbor discovery protocol for communicating a one way unacknowledged neighbor discovery protocol message by a neighbor discovery protocol transmitting device to a neighbor discovery protocol receiving device in a power management system wherein the neighbor discovery protocol transmitting device is power meter, an intelligent electronic device (IED) or a Modbus device which is operable to update message data and periodically or dynamically transmit a neighbor discovery protocol message for receiving device information about the neighbor discovery protocol transmitting device;
   receiving a neighbor discovery protocol message from one or more neighbor discovery protocol transmitting devices over the network, wherein the neighbor discovery protocol message for a particular neighbor discovery protocol transmitting device includes device information for that particular transmitting device and each neighbor discovery protocol transmitting device comprises, at least, a power meter, an intelligent electronic device (IED) or a Modbus device;
   reviewing the neighbor discovery protocol message from the one or more neighbor discovery protocol transmitting devices to identify at least one or more of the transmitting devices on the network; and
   listening for another neighbor discovery protocol message from each of one or more neighbor discovery protocol transmitting devices on the network, wherein the receiving and reviewing are repeated for each of the neighbor discovery protocol messages that are received.

2. The method of claim 1 wherein the neighbor discovery protocol message comprises a plurality of type-length-value ("TLV") components that encode the device information.

3. The method of claim 2 wherein the type from the type-length value is analyzed to ignore certain TLV components.

4. The method of claim 2 wherein neighbor discovery protocol message comprises a plurality of capability bits, wherein each of the capability bits corresponds with a capability of a neighbor discovery protocol transmitting device.

5. The method of claim 4 wherein the device information comprises capability of the neighbor discovery protocol transmitting device as reflected by the capability bits.

6. The method of claim 1 further comprising:
   determining when the received device information for the particular neighbor discovery protocol transmitting device has changed; and
   updating the device information for the particular neighbor discovery protocol transmitting device only when the device information has changed.

7. The method of claim 1 wherein the neighbor discovery protocol message comprises a User Datagram Protocol ("UDP") datagram.

8. The method of claim 1 further comprising:
   implementing a security feature that establishes a security state for a particular neighbor discovery protocol receiving device, wherein the neighbor discovery protocol messages are ignored by the neighbor discovery protocol receiving device when in the security state.

9. The method of claim 1 wherein the neighbor discovery protocol message includes a community assignment for each of the neighbor discovery protocol transmitting devices, wherein the reviewing of the neighbor discovery protocol message from the neighbor discovery protocol transmitting devices is only for the transmitting devices assigned to a particular community.

10. The method of claim 9 wherein the neighbor discovery protocol message from a transmitting device assigned to a different community is not reviewed.

11. A network system comprising:
    a local area network;
    at least one protocol transmitter in the local area network that transmits one way unacknowledged neighbor discovery protocol messages comprising information about the at least one protocol transmitter, wherein the at least one protocol transmitter comprises at least, a power meter, an intelligent electronic device (IED) or a Modbus device that is operable to update message data and transmits messages periodically; and
    at least one protocol receiver in the local area network that receives the protocol messages from the at least one protocol transmitter and extracts the information about the at least one protocol transmitter,
    wherein the extracted information from the at least one protocol transmitter is used to automatically discover each of the at least one protocol transmitter upon receipt of the messages from each of the at least one protocol transmitter.

12. The system of claim 11 wherein the at least one protocol transmitter further comprises:
- an updater that updates information about the at least one protocol transmitter;
- a formatter that formats the protocol message;
- an appender that appends information about the at least one protocol transmitter within the protocol message; and
- a transmitter for transmitting the protocol message from the at least one protocol transmitter.

13. The system of claim 11 wherein the at least one protocol receiver further comprises:
- a listener that listens for and receives the protocol messages from the at least one protocol transmitter;
- a parser that identifies relevant information from the protocol messages;
- an updater that extracts the relevant information for analysis; and
- a releaser that releases the protocol messages.

14. The system of claim 11 further comprising:
- an additional local area network coupled with the local area network;
- at least one protocol transmitter in the additional local area network;
- at least one protocol receiver in the additional local area network;
- wherein the discovery of devices comprises the at least one protocol transmitter in the local area network and in the additional local area network.

15. The system of claim 14 further comprising:
- a first router coupled with the local area network; and
- a second router coupled with the additional local area network, wherein the first router and the second router are connected and enable communications between devices in both of the local area networks.

16. The system of claim 11 further comprising:
- a gateway device that functions as both a protocol transmitter and a protocol receiver.

17. The system of claim 16 wherein the gateway device is configured to provide a report of each device that is connected with the gateway device.

18. The system of claim 17 wherein the devices connected to the gateway device comprise at least one of a power meter or an intelligent electronic device, which are connected to the gateway device through a serial connection.

19. The system of claim 11 wherein the network system comprises a power measurement system and the at least one protocol transmitter comprises one of a power meter or an intelligent electronic device.

20. The system of claim 11 wherein the at least one protocol receiver comprises one of a mobile application or a software program.

21. The system of claim 11 wherein the information about the at least one protocol transmitter comprises at least one of a software version, community assignment, or device reliability.

22. A method for providing a neighbor discovery protocol for communication, the method comprising:
- transmitting a one way unacknowledged message according to the neighbor discovery protocol over a network, wherein the message comprises information about the device transmitting the message and the device transmitting the message comprises, at least, a power meter, an intelligent electronic device (IED) or a Modbus device that is operable to update message data and transmit messages periodically or dynamically;
- receiving the message according to the neighbor discovery protocol over the network; and
- discovering the devices on the network based on receipt of the transmitted message;
- wherein a new device on the network transmits a message according to the neighbor discovery protocol that is discovered upon receipt of the message.

* * * * *